United States Patent [19]

Lamb et al.

[11] 3,927,302

[45] Dec. 16, 1975

[54] RECORD CARD SYSTEMS

[75] Inventors: Kenneth Lamb, Shiremoor; Roderick Wilson Froud Durham, both of England

[73] Assignee: International Time Recording Company Ltd., London, England

[22] Filed: Feb. 5, 1973

[21] Appl. No.: 329,385

[52] U.S. Cl. 235/61.9 R; 235/61.11 E; 235/61.12 R

[51] Int. Cl.$^2$. G06K 1/12; G06K 7/10; G06K 19/00

[58] Field of Search ... 235/61.9 R, 61.8 R, 61.11 E, 235/61.6 R, 61.1

[56] References Cited

UNITED STATES PATENTS

| | | | |
|---|---|---|---|
| 2,983,443 | 5/1961 | Robinson et al. | 235/61.8 R |
| 3,735,093 | 5/1973 | Kendall et al. | 235/61.1 |
| 3,754,120 | 8/1973 | Fitzgerald et al. | 235/61.8 R |
| 3,760,160 | 9/1973 | Gieringer et al. | 235/61.8 R |

FOREIGN PATENTS OR APPLICATIONS

| | | | |
|---|---|---|---|
| 1,143,032 | 2/1969 | United Kingdom | 235/61.9 R |

*Primary Examiner*—Daryl W. Cook
*Attorney, Agent, or Firm*—Kemon, Palmer & Estabrook

[57] ABSTRACT

A time recording system comprises a printing mechanism activated when a time card is inserted in a recorder to print time information on a selected portion of the card. The recorder includes a light-responsive sensing device which generates a voltage signal in response to activation by a light source. The sensing means is positioned so as to read pre-recorded data from a selected region of the card when the printing mechanism is activated, and operates by sensing light which passes through holes punched in the card.

4 Claims, 3 Drawing Figures

RECORD CARD SYSTEMS

BACKGROUND OF THE INVENTION

This invention relates to a method and apparatus for reading data from a record card, that data being in the form of coded information in a selected area of the record card, and is particularly, although not exclusively, applicable to time recording apparatus.

In most companies, employees are required to record on individual time cards, their time of arrival and time of leaving their place of work, the period of day or work cycle, i.e. normal, overtime etc. At the end of each weel these times are collated by clerical means to determine the number of payable hours worked each week by each employee.

This is a non-productive and somewhat time consuming process which is often complicated by the payment of varying hourly rates, special rates for overtime and specific work cycle. At the present time the calculation of payrolls is often carried out by computer from data read manually from the time cards, and the clerical work thus involved is both expensive and slow.

An important and basic problem in mechanising this operation is to provide some method of automatically recognising each individual employee as he arrives and leaves. It has been proposed in British Pat. No. 1,143,032 (U.S. Pat. No. 3,453,643) to punch an identification code on the time card representing an identification number for the relevant employee. This number is then read by a plurality of spring-loaded mechanical fingers which, when the card is stationary in the reader, are advanced towards the card. Where a hole has been punched in the card the respective finger will pass through the card and connect with an electrical contact on the other side of the card. This system is mechanically complex because of the need to advance and retract the fingers while the card is stationary, and indeed considerable damage could be caused if the card was removed before the fingers had been fully retracted. Also, the system is large and requires a considerable amount of space, this is a disadvantage if it is desired to fit it to existing recorders, and its bulk complicates the construction of the unit as the reader may be required to be movable relative to a printing device for printing time information on the card. Furthermore incorrect reading can occur due to dirt or grease collecting on the fingers or contacts and a regular maintenance schedule is necessary to ovecome this.

SUMMARY OF THE INVENTION

According to the present invention there is provided a data recording system including printing means for applying alpha-numeric information to a record card, and a light-responsive sensing means for generating an electrical signal in response to activation by a light source, the sensing means being adapted to read prerecorded data from a selected region of a record card at the same time as the printing means is actuated.

In a preferred embodiment the sensing means feeds data in the form of an electrical signal to a data storing bank at the same time as the printing means is actuated, the data storing bank also being provided with a series of reference signals representing finite periods of time between which signals the printing means is actuated.

The sensing means may be attached to a card guide which holds the record card in a close relationship to the printing means, and the card guide together with the sensing means may be movable relative to the printing means. Means may be provided for detecting the positional location of the card guide and to signal this position to the data storing bank, this signal representing a period of day or work cycle at which the alphanumeric information is applied to the card.

A number of such data recording systems may feed signals to a similar number of data stores located in a common unit.

Preferably, the pre-recorded data is in the form of punched holes, perforations or other apertures formed at selected positions and representing information in coded form.

The sensing means are preferably silicon voltaic cells with integrated circuit amplifiers and the light source is provided by light emitting gallium-arsenide phosphide diodes.

In a preferred embodiment the record card is a time recorder payroll card on which the information is applied in the form of visible alpha-numeric characters representing the day and time, the information being printed on the card by a print mechanism actuated on insertion of the card into the time recorder. The time recorder is provided with sensing means which, simultaneously with the actuation of the print mechanism, senses pre-recorded data in a selected region of the card and causes an electrical signal representing the pre-recorded data to be fed to a data storing bank together with signals representing the information being applied to the card.

BRIEF DESCRIPTION OF THE DRAWINGS

Further features of the invention are contained in the following description of a preferred embodiment, described by way of example only, in relation to the accompanying drawings in which.

DESCRIPTION OF THE PREFERRED EMBODIMENT

Figure 1:
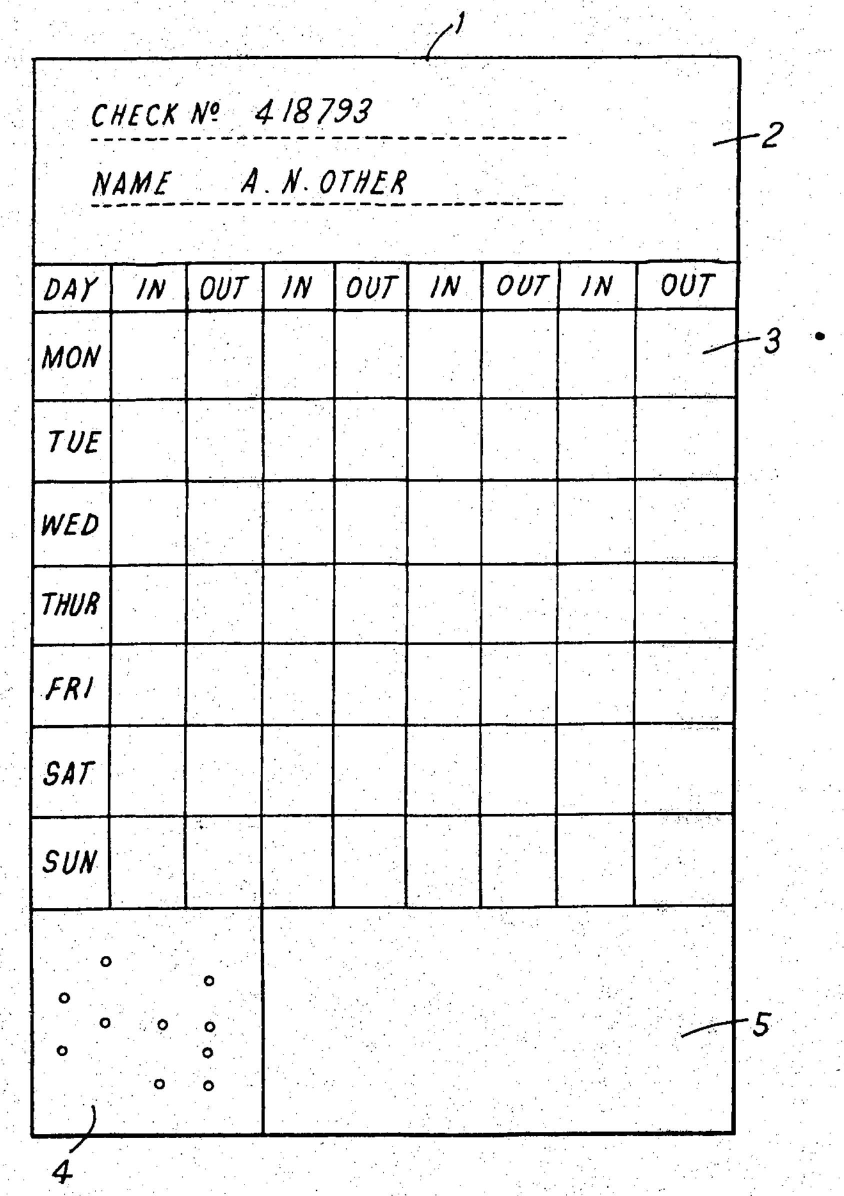
FIG. 1 is a representation of a specimen record card, of the kind used in time card recording systems for use by employees.

The typical form of a time card is illustrated in FIG. 1 and shows a rectangular card 1 having an upper portion 2 identifying the individual to whom the card is applicable. A number of ruled horizontal and vertical columns are shown at 3 divided up into days of the week and into four work cycles marked "IN" and "OUT." Spaces are thus provided to record the time of arrival or departure of the individual on specific days and on one of the four work cycle periods. On the bottom left hand part of the card 4 is reserved a space for the allocation of punched holes in coded form representing data which is relevant to the individual. For example his payroll number and department may be recorded in binary coded decimal format. Region 5 at the foot of the card may contain other data in coded form or alpha-numeric information. It will be appreciated that other forms of layout may be used.

Figure 2:
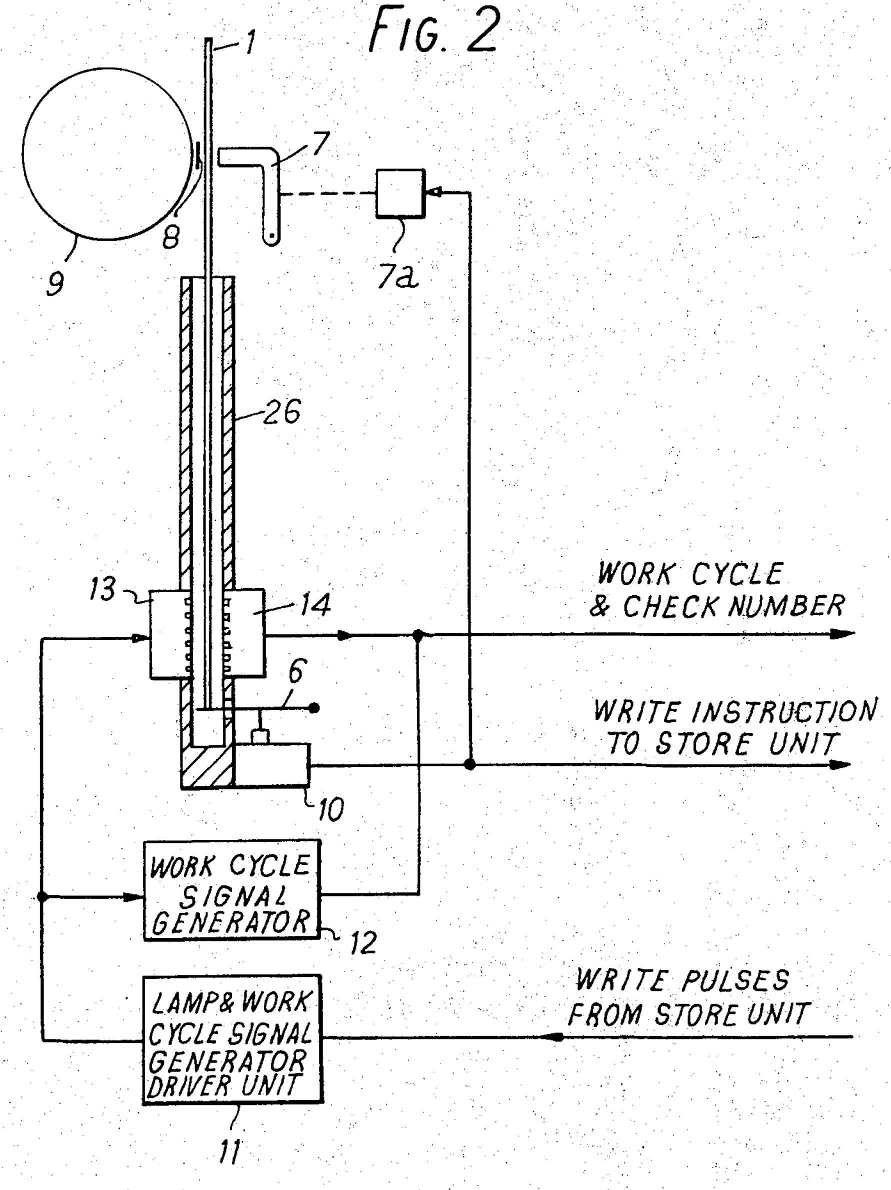
FIG. 2 shows in diagrammatic form a card reading arrangement embodying the invention.

FIG. 2 illustrates schematically the manner in which the card can be used to provide automatically the information required in accordance with the invention. The time recorder of FIG. 2 comprises a card holder 26 positioned below a print hammer 7 and opposed ink ribbon 8 and type wheels 9. The holder may continue above the printing mechanism, or other guide means for the card 1 may be positioned above the printing mechanism. The card holder defines the horizontal position of a card inserted therein relative to the printing mechanism, and by virtue of a trigger member 6 defines the vertical position of the card when fully inserted. The card holder 26 is adjustably mounted so as to be movable horizontally and vertically so as to bring a predetermined section of the card 1 in front of the print hammer 7 when the card is fully inserted.

The trigger member 6 is mounted for movement with the card holder 26 and is connected to a microswitch 10. Also mounted for movement with the card holder is a lamp assembly 13 and an optical readout system 14 arranged on opposed sides of the card position.

A lamp work cycle signal generator and driver unit 11 has its output connected both to the lamp assembly 13 and to a work cycle signal generator 12, and the output of generator 12 is connected to the readout system 14.

In the preferred embodiment the readout system 14 comprises photovoltaic cells in the form of silicon voltaic cells with integrated circuit amplifiers and the light source is provided by solid state lamps such as light emitting gallium-arsende phosphide diodes, but it will be understood that other sensing means and light sources may be used. For example, the light source may be formed of an electroluminescent panel.

The operation of the recorder shown in FIG. 2 is as follows.

The time card 1 is inserted into a card receiver throat of the time recorder, and by depressing the card down onto the recorder print trigger 6 the print hammer 7 is actuated by solenoid means 7*a* to press the time card against the ink ribbon 8 and type wheels 9, thus recording indelibly on the time card the instant of time in the appropriate column and simultaneously initiating from microswitch 10 an electrical signal, a "write" instruction, to an appropriate section of a store unit. The "write" instruction causes an "address" signal to be fed into the lamp and work cycle signal generator of unit 11 which in turn energises in sequence a work cycle signal generator 12 and six rows of lamps in the lamp assembly 13. Energisation of the work cycle signal generator 12 and lamp assembly 13 causes signals corresponding to the card holder position and six digits on the card in position 4, shown on FIG. 1, to be generated in sequence by the work cycle signal generator 12 and the optical readout system 14. It will be appreciated that the optical readout system 14 senses the holes representing data which have previously been punched in the card.

Figure 3:
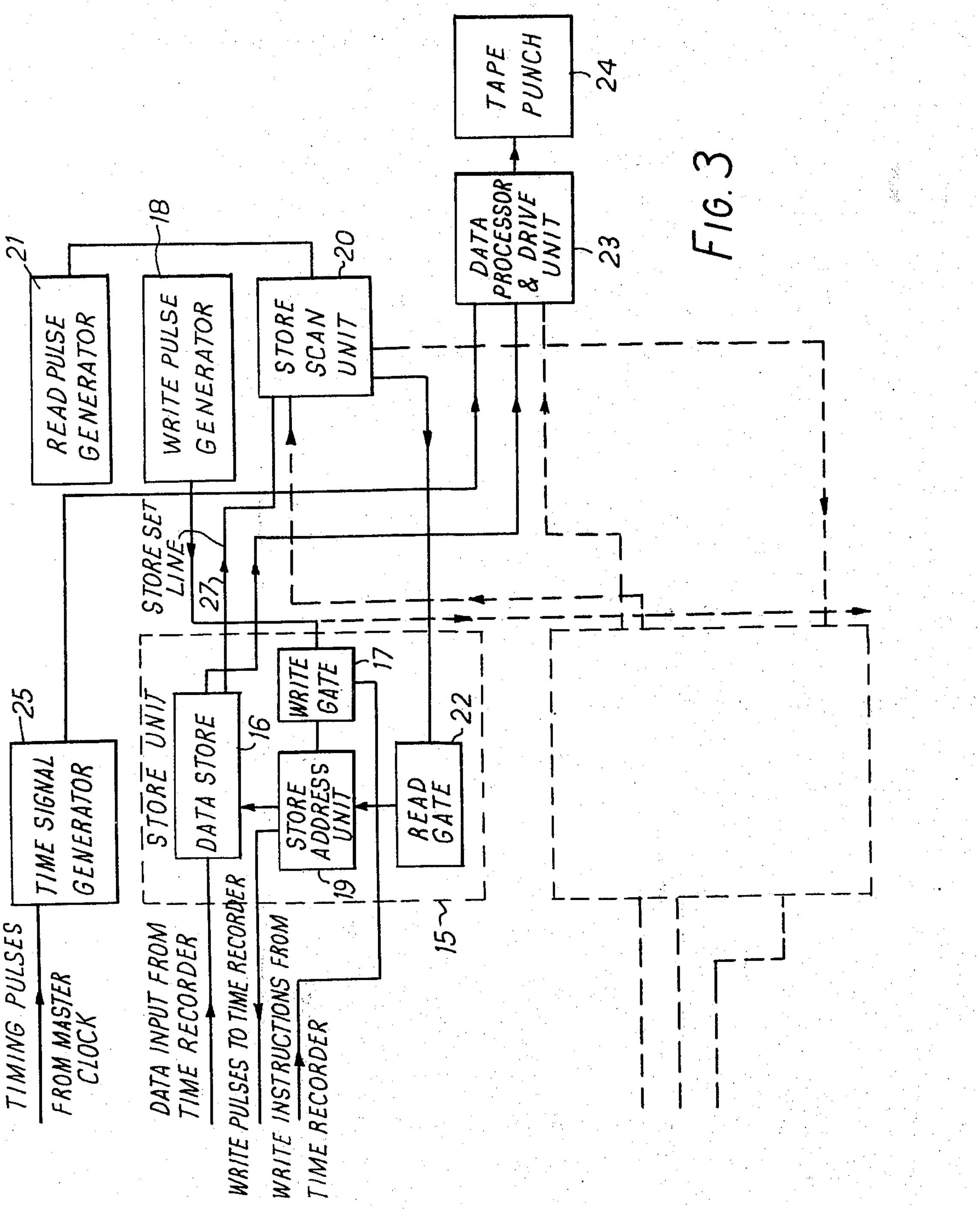
FIG. 3 is a block schematic circuit diagram of a storage and readout system embodying the invention.

FIG. 3 illustrates one channel of a typical multi-channel data storage system applied to a time recorder system in accordance with the invention and adapted for use with the recorder of FIG. 2. The store unit 15 comprises an eighteen word, four bit integrated circuit "read/write" memory unit or data store 16 and associated addressing and signal processing circuits. The "write" instruction received from microswitch 10 in the time recorder opens a "write" gate 17 which feeds pulses from a "write" pulse generator 18 to a store address unit 19. The store address unit 19 in turn feeds address signals both into the memory unit 16 and also out to the lamp and work cycle signal generator drive unit 11 in the time recorder shown in FIG. 2.

The data obtained from the time recorder in the manner previously described with reference to FIG. 2 is stored in the memory unit 16 during the reading operation. At the completion of this operation a signal is set up on a "store set" line 27 and fed into a "store scan" unit 20.

A "read" pulse generator 21 feeds a continuous train of pulses into the "store scan" unit 20 which interrogates the "store set" lines of the stores in sequence until a store is located which has data stored in it. On locating this store, the unit ceases to scan the store set lines, and feeds read pulses into the "read" gate 22 of the store unit which cause the stored data to be fed out from the memory unit 16 into a punch drive unit 23. This unit converts the data into a form suitable for driving a tape punch 24, and feeds this converted data into the tape punch.

At the completion of the data readout cycle from that particular store, the "store set" signal is removed and the "store scan" unit 19 recommences to scan the "store set" lines until the next store containing data is located, when this data is fed into the tape punch in a similar manner.

The "write" pulse generator 18 generates a continuous pulse train at a suitable repetition rate to enable all the required data to be read from a time card during the time it is stationary in a time clock during the printing operation.

The "read" pulse generator 21 generates a continuous pulse train, at a repetition rate dependent on the maximum operating speed of the tape punch used.

A time signal generator 25 comprises an electromechanical system which receives pulses every minute from a master clock, not shown, and converts these into a form suitable for feeding a reference time signal to the tape punch 24. The time signal is obtained from the time signal generator, in the same manner as data is obtained from the store units, in this case the "store set" line is set up after the receipt of each pulse from the master clock.

In a further embodiment, not shown, for use in conjunction with a time clock system, a modification to the "store readout" avoids an anomaly which could occur should a clock be operated very shortly before (e.g. within 1.5 seconds of) the time changing, causing the time print out to the computer to be 1 minute later than that on the time card. This is done by giving one complete scan and print out from the stores after receipt of the "time set" signal before reading out the time data.

Additional store units 15 and interconnections are shown in dotted outline in the lower part of FIG. 3, by means of which any number of time recorders may be connected into a common system.

The system therefore enables all the relevant data required for payroll calculations to be automatically punched onto paper tape or recorded on magnetic tape in a form suitable for feeding directly to a computer. The outputs of one or more time recorders are fed into a single tape punch through suitable encoding circuits or alternatively may be applied to a magnetic recording system. A time signal is also fed to the punch from one of the recorders or some other master clock at regular intervals, as required, so that as each employee clocks in or out, his check number and a code to indicate whether he is clocking in or out, normal or overtime, will be fed to the tape punch together with the time. Thus the payroll data will be presented to the computer in the following form:

TIME SIGNAL

In or out and period of work cycle.

CLOCK NUMBER

In or out and period of work cycle.

CLOCK NUMBER etc. . . .

It will be appreciated that whilst the specific embodiment relates to a time recorder system, this is in no way limiting and the invention may be applicable to other data recording systems requiring the recording of information on a record and feeding this information and other data to a data storing bank for simultaneous or subsequent processing.

The data recording system illustrated has many advantages over the prior art. Periodical maintenance of the reading device is virtually unnecessary since adjustment and cleaning of electrical contacts is not required. The reduction in space required for the reading head enables this type of reader to be fitted to an existing installation, which is not normally possible with a mechanical sensing device in view of the very much greater space which it occupies.

We claim:

1. A time recording system, comprising:

a plurality of time recorder-payroll cards;

at least two time recorder units; and a data processing unit;

wherein:

each time recorder-payroll card comprises a first region on which visible alpha-numeric information is applied representing day and time, and a second region carrying prerecorded data in punched form corresponding to an individual to whom the respective card relates;

each time recorder unit comprises:

solenoid-actuable print means positioned to apply alpha-numeric information to said first region of said record cards;

a plurality of solid-state light source elements positioned adjacent said second region of said cards;

a plurality of solid-state light sensor elements positioned opposed to said respective light source elements to generate respective electrical signals in response to activation thereof by said respective light source elements when a record card is in a fixed position in said recorder unit, said signals being representative of said pre-recorded punched data on a record card;

means responsive to the presence of a record card in said time recorder unit to a maximum permitted extent which is less than complete insertion for sequentially activating said solid-state light source elements and actuating said print means; and said data processing unit comprises:

at least two data stores each coupled to the solid-state light sensor elements of a respective time recorder unit;

means for continuously scanning said data stores to determine which if any of said data stores contains data from said respective time recorder;

a time signal generator to generate time signals; and means responsive to said data store scanning means to read said date from said data stores, said data being applied to an output together with said time signals.

2. A time recording system as claimed in claim 1, including card guide means for holding said time recorder-payroll card in a close relationship with respect to said print means, said light-responsive sensing means being attached to said card guide means for movement together therewith.

3. A time recording system as claimed in claim 2, including means for moving said card guide means relative to said print means, and means for detecting the positional location of said card guide means and signalling said positional location to said respective data store.

4. A time recording system as claimed in claim 1, wherein said light source comprises light emitting gallium-arsenide phosphide diodes, and said light-responsive sensor elements comprise silicon voltaic cells with associated integrated circuit amplifiers.

* * * * *